(12) United States Patent
Kramarz-Von-Kohout et al.

(10) Patent No.: US 8,930,466 B2
(45) Date of Patent: Jan. 6, 2015

(54) METHOD FOR INTERNET-BASED MESSAGING

(75) Inventors: Gerhard Kramarz-Von-Kohout, Bonn (DE); Matthias Roebke, Cologne (DE)

(73) Assignee: Deutsche Telekom AG, Bonn (DE)

( * ) Notice: Subject to any disclaimer, the term of this patent is extended or adjusted under 35 U.S.C. 154(b) by 643 days.

(21) Appl. No.: 12/747,935

(22) PCT Filed: Nov. 14, 2008

(86) PCT No.: PCT/EP2008/009656
§ 371 (c)(1),
(2), (4) Date: Jun. 30, 2010

(87) PCT Pub. No.: WO2009/089861
PCT Pub. Date: Jul. 23, 2009

(65) Prior Publication Data
US 2010/0293237 A1    Nov. 18, 2010

(30) Foreign Application Priority Data

Jan. 16, 2008   (DE) .......................... 10 2008 004 729

(51) Int. Cl.
*G06F 15/16* (2006.01)
*H04L 12/58* (2006.01)

(52) U.S. Cl.
CPC .............. *H04L 51/066* (2013.01); *H04L 51/36* (2013.01); *H04L 51/38* (2013.01); *H04L 51/28* (2013.01)
USPC ........................................ 709/206; 709/207

(58) Field of Classification Search
CPC .......... H04L 51/36; H04L 51/38; H04L 51/28
USPC ......................................................... 709/206
See application file for complete search history.

(56) References Cited

U.S. PATENT DOCUMENTS

| | | | |
|---|---|---|---|
| 6,185,603 B1 * | 2/2001 | Henderson et al. | 709/206 |
| 7,428,580 B2 | 9/2008 | Hullfish | |
| 7,711,002 B2 | 5/2010 | Mukherjee | |
| 2003/0007482 A1 * | 1/2003 | Khello et al. | 370/352 |
| 2003/0050984 A1 | 3/2003 | Pickup et al. | |

(Continued)

FOREIGN PATENT DOCUMENTS

| | | |
|---|---|---|
| DE | 19936855 A | 2/2001 |
| WO | 0141477 A | 6/2001 |

OTHER PUBLICATIONS

U.S. Appl. No. 60/951,415, filed Jul. 2007, Dorsey, Jack.*

*Primary Examiner* — Jude Jean Gilles
*Assistant Examiner* — Jaren M Means
(74) *Attorney, Agent, or Firm* — Andrew Wilford

(57) ABSTRACT

The invention relates to a method and a system for sending a message on the basis of an Internet protocol to an arbitrary call number of a recipient, wherein the recipient address is formed from the call number of the recipient and a domain addition, and the message is stored on a message server (4), particularly for further use and/or provision for the recipient. The message server (4) accesses a database (6) after the message is stored and determines from the data thereof at least one piece of information that can be associated with the call number via the technical features of a recipient terminal (3a, 3b, 3c, 3d) of the recipient, wherein depending on the information, a specific recipient message is transmitted to the recipient terminal (3a, 3b, 3c, 3d).

23 Claims, 1 Drawing Sheet

(56) References Cited

U.S. PATENT DOCUMENTS

| | | | |
|---|---|---|---|
| 2005/0114533 A1* | 5/2005 | Hullfish et al. | 709/230 |
| 2007/0140448 A1* | 6/2007 | Lin et al. | 379/93.17 |
| 2007/0142029 A1 | 6/2007 | Willehadson | |
| 2013/0166777 A1* | 6/2013 | Chen et al. | 709/246 |

* cited by examiner

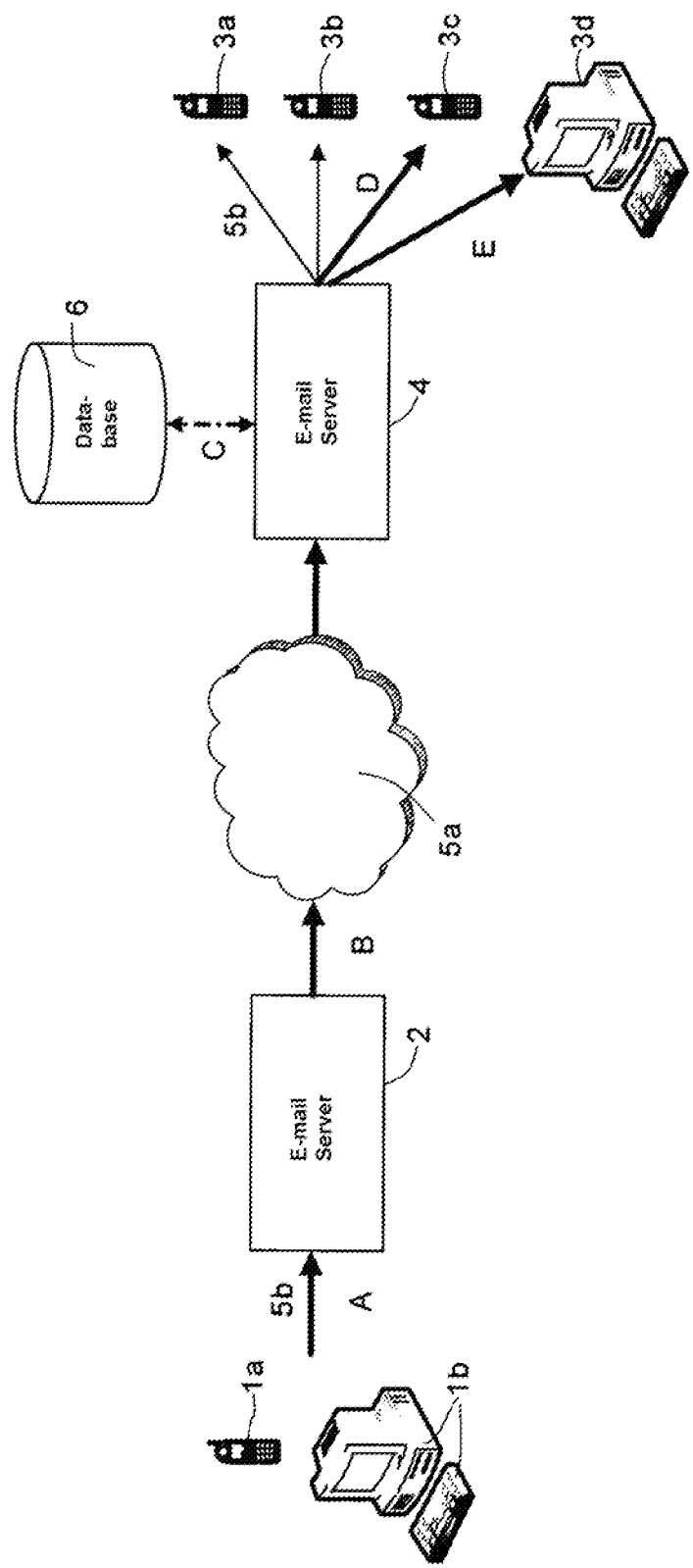

METHOD FOR INTERNET-BASED MESSAGING

CROSS REFERENCE TO RELATED APPLICATIONS

This application is the US-national stage of PCT application PCT/EP2008/009656, filed 14 Nov. 2008, published 23 Jul. 2009 as 2009/089861, and claiming the priority of German patent application 102008004729.5 itself filed 16 Jan. 2008, whose entire disclosures are herewith incorporated by reference.

FIELD OF THE INVENTION

The present invention relates to a method of sending a message on the basis of an internet protocol to a given call number of a recipient, where the recipient address is formed from the call number of the recipient and a domain extension and the message is stored on a message server, in particular for further evaluation and/or provision to the recipient.

BACKGROUND OF THE INVENTION

In current electronic telecommunications the transmission of messages on the basis of an internet protocol has gained particularly high importance due to the fact that the messages may be transmitted in a particularly convenient manner in computer networks. Various messaging services are employed that use a variety of protocols. Examples of message transmission services include e-mail, instant messaging, and uploading of a message to a domain.

The messaging service that allows the electronic sending of information is therefore regarded as the most important and frequently used service of the internet. In the case of e-mail, the carrier of the information is the so-called "body" of the e-mail, which in addition to the electronic text message may include any given data attachments such as images, music, or programs. Instant messages may also contain such data attachments.

Known from the mobile wireless field is the so-called Multimedia Messaging Service (MMS), which for various reasons has not developed into an application that is as widely used as e-mail service or instant messaging. One advantage of MMS over e-mail service is the greater variability of the destination address. A multimedia message may be sent as MMS to a call number or an e-mail address. However, this presumes that the sender has an MMS-capable terminal. In addition, the terminal of the recipient must either be MMS-capable, so that the recipient is able to directly retrieve and use an MMS sent to him, or must be set up to receive an electronic short message (Short Messaging Service (SMS)) so that the recipient is able to receive via SMS an internet address in the form of a Uniform Resource Locator (URL), at which he may access the MMS via the internet. Furthermore, without an MMS-capable terminal the recipient of an MMS is not able to reply to an MMS, not even via an e-mail, because the address to which a reply would be sent is a call number.

For the address handling, dynamic approaches such as Telephone Number Mapping (ENUM)-based services are known that allow use of the Domain Name system (DNS) for translating telephone numbers into internet addresses. Such services have arisen from the need to provide the users of internet-based voice services, also referred to as Voice over Internet Protocol (VoIP), with accessibility under the same number, using the internet as well as the classic telephone. For ENUM services, however, the terminal of the user must be equipped with appropriate software, and all communication partners must be registered for the service with their respective addresses. Only communication partners who have stored an e-mail address as a contact address are able to receive e-mails. These services are thus limited to small groups, and are therefore unsatisfactory.

It is known from German Unexamined Patent Application DE 199 36 855 to provide a public line-based telephone network that basically offers all subscribers the option of text communication without the need for specialized equipment, where the text communication may be in e-mail format using a text message. It is proposed that each telephone subscriber is assigned his own internal network e-mail address, which is provided in the format "subscriber call number in E.164 format@operator.country." The e-mail may be delivered using only the subscriber call number, a mail server of the sender performs the task of delivering the e-mail after a text-to-voice conversion, and the delivery is carried out by outputting the converted-to-voice e-mail via the receiver of a given telephone.

It is very disadvantageous that the text of the e-mail must be converted to a voice message for delivery. Such a conversion fundamentally requires a clean text message and is also resource-intensive, and in particular for e-mails with graphical content and e-mails with file attachments is basically not possible. Because of the operating principle, the conversion to a voice message is carried out even when the terminal of the recipient is capable of receiving not only voice messages, but also data messages. A further disadvantage is that this is an internal network approach, and in addition to the call number of his communication partner the sender must generally also know the network provider (operator) for the communication partner as well as the corresponding country in order to be able to send an e-mail to the communication partner.

For instant messaging or uploading of messages to a domain, heretofore no message-sending process has been known that is based on a call number of the recipient.

OBJECT OF THE INVENTION

The object of the present invention, therefore, is to provide a method that allows standardized sending of messages across various networks on the basis of an internet protocol, in particular e-mails, instant messages, and messages with file attachments that are suitable for uploading to a domain, to a given call number of the intended recipient without the sender having to know the complete destination address, i.e. the recipient network provider, the recipient's instant-messaging address, or the domain address, thus enabling in particular uniform, centralizable international management of the message sending. The method is intended to be integratable into existing telecommunication networks with little effort.

SUMMARY OF THE INVENTION

This object is achieved by a method of sending a message on the basis of an internet protocol to a recipient, in particular to a given call number of the recipient, where the recipient address is formed from the call number of the recipient and a domain extension and the message is stored on a message server, in particular for evaluation and/or provision to the recipient, after the message is stored the message server accesses a database and determines from the data therein at least one information item that is or can be associated with the call number concerning the technical features of a recipient terminal of the recipient, and a specific recipient message is transmitted to the recipient terminal as a function of the information. In other words, after receipt of a message that is provided with a call number destination address, on the message server specified according to the domain extension, the information stored in a database is identified that may be associated with the call number of the recipient and from which the further process sequence is determined, the form and content of the specific recipient message that is transmitted from the message server to the terminal of the recipient being dependent on the corresponding identified information, i.e. the technical features. This recipient message may be an SMS, voice, e-mail, or instant message, for example.

The message to be sent may be an e-mail, in which case the message server is an e-mail server. Thus, according to a first aspect of the invention a method is proposed for sending an e-mail to a given call number of a recipient, where the e-mail address of the recipient is formed from the call number of the recipient and a domain extension and the message is stored on an e-mail server for further evaluation and provision to the recipient.

Alternatively, the message may be an instant message, IM for short, in which case the message server is an instant-messaging server. Thus, according to a first aspect of the invention a method is proposed for sending an instant-messaging message to a given call number, where the IM address of the recipient is formed from the call number of the recipient and an extension according to protocol and the instant-messaging message is transmitted to a server for further evaluation for, and delivery to, the recipient.

In another alternative, the message may be qualified by the fact that it is suitable for uploading to a specific domain, in this case the message server being a domain server. Within the meaning of the invention, a domain is a resource that is addressable via a Uniform Resource Locator (URL), in particular a server in a computer network, in particular the internet. URLs such as http://www.domain.de or http://www.subdomain.domain.de, for example, are usually also referred to as internet addresses. According to a third aspect of the invention, a method is proposed for sending messages suitable for uploading to a domain to a given call number of a recipient, the name of the domain being derived from the call number of the recipient. The message and respective file attachments are transmitted to an associated server by uploading, using a suitable network protocol, for example HTTP.

The database may preferably be a subscription database for recipients of e-mails, instant messages, or upload messages to call numbers, which holds subscriber-specific data, in particular call numbers and e-mail addresses of the subscribers, and characteristics of the terminals used by the subscribers. The terminal data held in the database is preferably information concerning the technical characteristics, for example landline telephone/mobile telephone, audio-capable, SMS-capable, e-mail-capable, and/or IM-capable. The information concerning the terminals may be stored in the database by the particular users of the terminals, or by the corresponding network provider. The information may be updated as needed, for example when the user replaces his terminal. The information may also preferably be derived on the system side, in which an SMS is sent or a call is made to the network provider that derives information from the type of telecommunication or the telecommunication services used and stores the information in the database. According to the invention, based on the fact that no specific type of terminal may be identified for a call number in the database, a conclusion may be drawn that a terminal having a specific technical feature, for example an e-mail-capable terminal such as a mobile telephone with e-mail software, is available to the recipient. This is also an information item that according to the invention is identified from the data that are present or not present in the database and is associated with the call number, and that determines the further process sequence. In addition, multiple information items may also be associated with a call number, for example terminal-specific data as well as one or more e-mail addresses.

The e-mail may be created and sent from a given terminal using customary e-mail software. An instant message or upload message may likewise be created and sent from a given terminal using customary instant-messaging software or upload software. This may be, for example, a stationary or portable computer or a mobile telephone having e-mail or instant-messaging software. Alternatively, an e-mail, instant message, or upload message may also be created in an online portal on the internet and sent to the call number of the recipient terminal. Within the meaning of the invention, an e-mail also having a conventional e-mail destination address may have first been sent to a first e-mail server, which in accordance with an instruction from the addressee of the e-mail stored on his e-mail server forward the e-mail to a call number of the recipient stated in the instruction, using the method according to the present invention.

Thus, using the method according to the invention it is possible, without special or additional software on the terminal of the sender, to send given e-mails, in particular e-mails having bodies in any possible format, for example HTML, and with file attachments, instant messages, and upload messages, directly to a call number in the E.164 format via mobile wireless, landline, or VoIP. For a computer or mobile telephone as the sender device, in the case of an e-mail message only one customary e-mail client is required, i.e. software for sending an e-mail. In the case of an instant message, only IM software is required. It is particularly advantageous that for sending an e-mail, instant message, or upload message it is sufficient for the sender to know an E.164 call number of his communication partner via mobile wireless, landline, or VoIP.

The method according to the invention also provides an important addition to the MMS service, since an MMS that has been sent to an e-mail address may then be responded to by the recipient in a media-compliant manner, i.e. by means of an e-mail to the call number of the sender of the MMS.

The device type of the receiving terminal for the method according to the invention may preferably be a landline or mobile telephone, where the landline telephone may be at least audio-capable, in particular also SMS-capable, and the mobile telephone may be at least SMS-capable, in particular also e-mail-capable, i.e. may have an e-mail client.

For the recipient address of the e-mail, an identifier that is independent of the network provider of the recipient may be added to the call number as a domain extension. This ensures in particular that in order to send the e-mail the sender of the e-mail does not have to know which network or provider the recipient uses. This is of particular interest since, due to the portability of call numbers which is common at the present time (i.e. customers may keep their call number when changing network providers), an individual call number no longer necessarily refers to a specific network provider. Thus, by using an identifier that is independent of the network provider, standardized international e-mails may be sent to given call numbers across various networks.

The identifier may preferably be automatically added when the e-mail is sent to the call number: if the e-mail client recognizes a call number as the destination of the e-mail, the call number is supplemented, in accordance with RFC2822, in a program-controlled manner with the identifier for an e-mail address that is specified for this service. This has the advantage that the sender does not have to know the identifier in order to address the e-mail, and also does not have to expend additional effort in addressing the e-mail.

The identifier may preferably be formed from the "@" character, followed by a neutral domain that is independent of the network provider of the recipient, followed by a period and a neutral extension that is independent of the company and country.

Alternatively, the identifier for the message transmission may also have a domain that may be identified with the network provider, the extension characterizing the country in which the network of the network provider is operated, for example @telekom.com or also @telekom.de.

In the case of an instant message or message for uploading to a domain (upload message), the domain extension may be formed from a first partial identifier and a second partial identifier, the first partial identifier preceding the call number and the second partial identifier following the call number. For an upload message, the first partial identifier may be "http://www.", and the second partial identifier may be an extension in the form of a top-level domain that is preceded by a period. For an instant message, for example the first partial identifier may be "sip:", and the second partial identifier may be formed from a "@" character, which is followed by a host name in the form of a second-level domain, which is followed by a period and an extension in the form of a top-level domain.

Also in the case of an instant message and an upload message, the call number may be automatically completed by addition of the domain extension to form a complete destination address. This may be achieved in particular when the message is sent from the terminal of the sender, either the sender terminal or a server associated therewith performing the completion.

According to the invention, for the case that the call number may be associated with an audio-capable terminal, i.e. a non-SMS-capable mobile or landline telephone, as the device type, the recipient message is a voice message, i.e. a call to the landline telephone or the mobile telephone by means of which the recipient is informed of the receipt of the message, and an internet address and, if necessary, a password is communicated, at which or by means of which the e-mail, instant message, or upload message may be retrieved. The information concerning the receipt of the message, as well as the communication of the internet address and the password, may thus be provided by a voice message. This means that from the database, the information that may be associated with the call number is determined that the call number included in the e-mail address, IM address, or domain address is associated with a terminal that is only audio-capable, and that the recipient message in the form of a voice message is transmitted to the landline telephone by calling the landline telephone. The same applies for the case that the call number is associated with a mobile telephone that has neither SMS nor e-mail functionality, so that a message may be transmitted to the user of the recipient device only via voice. It is thus possible for telephones that do not have modern electronic communication via e-mail, instant messages, or internet access to be informed of the receipt of a message. The retrieval may be performed by retrieving the internet address transmitted with the recipient message, using a conventional browser. If the internet address to be conveyed to the recipient has already been communicated in some other way, for example in writing before the first use of the service, the reference to the internet address may be omitted in the voice message.

Furthermore, for the case where an SMS-capable terminal, in particular an SMS-capable landline or mobile telephone, is associated with the call number, the recipient message may be an electronic short message by means of which the notification is made of the receipt of the message, and an internet address and, if necessary, a password is communicated by means of which the message may be retrieved. If the internet address to be conveyed to the recipient has already been communicated in some other way, for example in writing before the first use of the service, the reference to the internet address may be omitted in the electronic short message.

Alternatively, for the case that an e-mail-capable terminal, in particular an e-mail-capable mobile telephone, is associated with the call number, the recipient message may be the e-mail itself. The e-mail may be transmitted to or retrieved from the e-mail server directly by the mobile telephone.

In a further alternative for the case of an instant message (IM)-capable terminal, in particular an IM-capable mobile telephone, is associated with the call number, the recipient message may be the instant message itself. The instant message may be transmitted or retrieved from the instant message server directly to the mobile telephone.

In a further alternative for the case that from the data in the database the information may be determined that a "classic" e-mail address (i.e. the call number is not a component of the e-mail address) may be associated with the call number, the e-mail may be forwarded to the address. In this case an e-mail-capable terminal, for example a stationary computer with e-mail software, may be assumed as the device type, the forwarding of the e-mail being regarded as a "message" in the above sense, which in this case is indirectly transmitted to the terminal of the recipient. An e-mail address may also be stored in the database in addition to the device type information, so that in addition to direct notification of the terminal according to the invention by means of the call number, the e-mail may be forwarded to another e-mail server, resulting in an additional indirect notification of the computer as a terminal. The recipient of the e-mail may then retrieve this e-mail as conveniently as a conventional e-mail that is directed to him.

Furthermore, in the event that no data concerning a particular device type can be found for the call number in the database, it may preferably be assumed that the addressee of the e-mail retrieves the e-mail, at least temporarily, via an internet address known to him or by means of an e-mail client. In this case the information is obtained from the data in the database that the terminal is e-mail-capable, by means of which the recipient independently retrieves the e-mail. The e-mail may be left on the e-mail server for retrieval by the recipient, so that, depending on this special case, there is no additional method step, in particular no other recipient message to the recipient.

It is advantageous that in the case of a recipient message in the form of a call or an SMS, the subject of the e-mail is communicated with the recipient message, whereby in the event of a call the subject is converted to a voice message and announced. The recipient may thus be immediately informed of the content of the message, and is able to decide the priority for obtaining knowledge of the content of the message.

It is also advantageous that in the case of a recipient message in the form of a call or an SMS, a password is communicated with the recipient message that grants access to the message via the internet address. This ensures a high level of security regarding the privacy of the message contents, since only persons who know the content of the SMS have access to the message.

It may further be provided that the message is cached when it cannot be transmitted to the recipient terminal. This may occur, for example, when the terminal of the recipient is temporarily unavailable, for example because it is turned off or has no connectivity to the network. It is thus ensured that the message is not lost.

It may further be provided that individual call numbers or groups of call numbers are blocked by the network provider or by the recipient himself for the receipt of e-mail, instant messages, and/or upload messages. In this case, before the message is transmitted a check may be made as to whether the call number is enabled or blocked for the receipt of messages on the basis of an internet protocol.

The sender may preferably be sent a conventional e-mail when the e-mail is not deliverable to the call number. This may occur, for example, when the call number is blocked for receipt of e-mail. The sender may thus be informed of the delivery or nondelivery of the e-mail to the recipient.

The system according to the invention for carrying out the method includes at least one first sender-side terminal for a telecommunication that is set up for creating a message on the basis of an internet protocol, a first message server associated with the first terminal, at least one second, receiver-side terminal for telecommunication, a second message server associated with the second terminal, and a telecommunication network having a first portion that connects the message servers to one another and a second portion that connects the terminals to their respective message servers, a database being associated with the receiver-side server in which a call number associated with the recipient is stored, and that holds at least one information item, which may be associated with the call number, concerning the technical features of the second terminal. The information may preferably include the type of the second terminal, i.e. the terminal used by the recipient, or an e-mail address of the recipient.

The message to be sent may be an e-mail, an instant message, or a message that is suited for uploading to a domain (upload message). In the case of an e-mail, the two servers are e-mail servers; in the case of an instant message, the servers are instant-messaging servers; and in the case of an upload message, the servers are domain servers.

For an upload message, the first and second terminal may each be an internet-capable mobile or stationary terminal. According to the invention, the upload message is transmitted to the domain server by uploading. The second terminal, i.e. the recipient terminal, is able to access the second server so that the upload message may be retrieved by the recipient terminal.

The method according to the invention may thus be carried out in a particularly advantageous manner by creating an e-mail on the first terminal, in particular an e-mail provided with an attachment and with an e-mail address derived from an E.164 call number, and sending the e-mail from this terminal, the e-mail first arriving at the first e-mail server that provides e-mail service to the sender. The e-mail is further transmitted via the telecommunication network to the second, receiver-side e-mail server. After receipt of the e-mail, this second e-mail server recognizes the E.164-call number within the e-mail address and determines in the database associated with the server the particular device type of the receiving terminal associated with the call number, so that a specific message is transmitted to the second terminal as a function of the information concerning the device type that is available or identifiable in the database.

The system may preferably have storage means for caching the message, so that the message is not lost in the event that the terminal is unavailable. The same applies for the e-mail itself, so that the recipient has sufficient time to retrieve the e-mails that are intended for him.

In addition, the first portion of the communication network may preferably be formed by the internet, and the second portion of the communication network may be formed by a line-based telephone network or a mobile wireless network.

The invention is described in detail below with reference to illustrated embodiment variants, and the FIGURE.

The message is transmitted on the basis of internet protocols. The methods share the common feature that the call number of the recipient is known. The type of message transmission includes the known services such as e-mail, instant messaging, and uploading to a domain, but is basically not limited to the named examples. The identity of the recipient that is used for the particular service is preferably derived from the call number of the recipient. The methods preferably take into account the technical features of the recipient terminal, which in addition to other suitable parameters are stored in a database and associated is with the call number. In general, according to the invention a domain extension in the form of a service-specific identifier of the recipient is derived from the call number of the recipient in a standardized manner. The message is delivered or retrieved with the assistance in particular of the parameters identified from the above-referenced database.

BRIEF DESCRIPTION OF THE DRAWING

The sending of an e-mail according to the invention is explained below with reference to a sole drawing FIGURE that is a schematic illustration of the system according to the invention for carrying out the method according to the invention.

DETAILED DESCRIPTION

The inventive system has a first terminal 1a, 1b for telecommunication, which may be a mobile telephone 1a or a computer 1b and that is set up for creating an e-mail, a first e-mail server 2, also referred to as the origin e-mail server, that is associated with the first terminal 1a, 1b, four second terminals 3a, 3b, 3c, 3d for telecommunication that by way of example are provided with various functionalities, a second e-mail server 4, also referred to as the destination e-mail server, that is associated with the second terminals 3a, 3b, 3c, 3d, and a telecommunication network 5a, 5b that connects the servers 2, 4 to one another and connects the terminals 1, 3a, 3b, 3c, 3d to their respective servers 2, 4, a subscription database 6 being associated with the second server 4, in which a call number associated with each of the second terminals 3a, 3b, 3c, 3d, and a technical characteristic, in particular the type of the second terminal 3a, 3b, 3c, 3d that is or may be associated with the call number, are stored. If necessary, the e-mails stored on the e-mail server 4 may be received using an e-mail-capable terminal, i.e. a stationary computer 3d, for example.

Terminal 3a is a telephone, in particular a mobile telephone that is at least e-mail-capable. Terminal 3b is a telephone, in particular a landline or mobile telephone, that is at least SMS-capable, and terminal 3c is a telephone, in particular a landline telephone, that is at least audio-capable. It is noted that an e-mail-capable telephone is considered to be e-mail-capable within the meaning of the invention when it is also SMS- and/or audio-capable, and an SMS-capable telephone is considered to be SMS-capable when it is also audio-capable. In this regard, preferably the highest-level functionality of the terminal is definitive for its association with the device types of an e-mail-capable, SMS-capable, and audio-capable terminal. In addition, if the receiving terminal is IM-capable, the specific message may be delivered as an instant message.

The telecommunication network may be formed by the internet in portions 5a, at least between the origin server and the destination server, whereas in other portions 5b, at least as a connection between terminals 1, 3a, 3b, 3c, 3d and servers 2, 4, the telecommunication network may be designed as a line-based telephone network, high-speed data network, or mobile wireless network.

The following method steps according to the invention are illustrated in the FIGURE:
- A: Sending the "call number e-mail" to the origin mail server
- B: Routing the e-mail to the destination e-mail server
- C: Querying the database regarding the capabilities of the destination terminal
- D: Delivering the e-mail or the specific message which may be associated with the e-mail, depending on the technical features of the destination terminal
- E: Retrieving the e-mail via internet In the FIGURE, the transmission path of an e-mail is illustrated by thick arrows. The transmission path of the specific recipient message is illustrated by thin arrows, it being noted that in the case of the e-mail-capable recipient terminal 3c the specific recipient message is the e-mail itself. In addition, the transmission path of the control information for the database query C is illustrated in the FIGURE by a dash-dotted line.

The recipient may open the call number e-mail, depending on the technical capabilities of his recipient terminal, either directly or via a URL, or may forward the call number e-mail to any given conventional e-mail address in accordance with the RFC2822 standard.

Thus, a mail service that may be used for landline as well as mobile wireless subscribers and that combines the distribution and acceptance of the e-mail with the additional possibilities of the MMS service is advantageous in particular with regard to the use of the E.164 call numbers for addressing. Moreover, in the present invention no central entity is queried by the terminal of the sender in order to obtain address information, which is the case for ENUM-based services, so that the described method may be regarded as usage-efficient as the result of a correspondingly low prevalence of signaling.

Existing ENUM-based services are distinguished by the fact that the complete address information (call number, e-mail address, SIP address, etc.) of the communication partner is provided as plain text to the querying user. In this regard it is an advantage of the present invention that, in principle, no querying of address information is necessary, and therefore there is no need to transmit sensitive user information in plain text. Consequently, in contrast to existing ENUM-based approaches the described method is considered to be safe in terms of protecting privacy of personal data.

The method according to the invention may be implemented in various ways. In order to meet the various requirements of a sender on the one hand and of a recipient on the other hand, two different scenarios are considered below by way of example.

In a first case, the sender desires to send an e-mail addressed to a call number of the recipient:

The sender, who uses a stationary or mobile terminal, i.e. a PC or mobile telephone for example, wishes to send an e-mail to a recipient whose call number the sender knows. For this purpose the call number is supplemented with an e-mail identifier, i.e. a domain extension, to form a complete e-mail address, and the domain extension may be specified in advance. The supplementation may be performed manually or automatically. The exact format of the e-mail address is defined in RFC2822.

The resulting destination address is generally E.164@domain.extension. The E.164 call number is 022893612345, for example. Depending on the embodiment, the destination address may include the call number in the national format, i.e. 022893612345@domain.extension, or in the international format, i.e. 4922893612345@domain.extension or +4922893612345@domain.extension.

In order that the sender of the e-mail does not have to know the network provider for the terminal intended for receipt of the e-mail, it is preferred to select a neutral identifier, for example 491711234567@xyz.com, or, for a national, provider-specific approach in Germany, a domain associated with a company, having a "de" identifier as the top level domain, for example 01711234567@telekom.de. If the destination group for the receipt of the call number e-mails relates only to wireless mobile customers, an identifier may also be provided that specifies this destination group in particular, for example 491711234567@mobi.mobi. A neutral identifier is preferably selected to allow standardized, international or national, network- or provider-wide approaches. The neutral identifier would also have the advantage that the sender does not have to know the network provider of the recipient in order to send him or her an e-mail.

The destination address of the e-mail addressed to a call number is modified or supplemented as described above. The resulting e-mail having the modified destination address is sent on the stationary or mobile terminal of the sender, using a customary e-mail client, and via the origin mail server is delivered to the destination e-mail server in question. The addressed e-mail server recognizes from the structure of the destination address that a call number e-mail is involved. The operator of the destination e-mail server for the above identifier may enable or activate for the service the call numbers or circuits that are accepted for receipt of the e-mail.

The manner in which delivery is carried out depends on the technical capabilities of the terminal used by the recipient, and also whether, and if so, with what information, the recipient has registered with the provider of the system for this service.

In particular, the sequence for delivery or receipt of the call number e-mail is designed as follows:

If the recipient has a terminal with an e-mail client, i.e. a computer or a mobile telephone holding e-mail software, he must appropriately configure the terminal, for example by indicating the address of the POP3 server supplied by the provider for receipt of e-mails. After appropriate configuration, the recipient may retrieve the call number e-mails intended for him by using a push service or a pull service, similarly as for the known receipt options for "classic" e-mails. In the case of a push-oriented delivery, the e-mail is automatically transmitted, without further activity by the recipient, to the terminal that is set up for receipt of the e-mail. For pull-oriented delivery, on the other hand, the e-mail is stored on the destination e-mail server, from which the recipient may then manually retrieve the e-mail, using his e-mail client. Technically, in this case the subscriber does not have to have a subscription. Instead, based on the fact that no information concerning the capability of the terminal associated with the call number is held in the subscription database, a conclusion may be drawn that recipients themselves retrieve in a conventional manner the call number e-mails intended for them via a terminal using the e-mail client, without a subscription.

However, the subscription database may also hold the information that the terminal associated with the call number is e-mail-capable, so that in this case the e-mail is transmitted as a message to the terminal. In addition, information may be stored concerning whether the e-mail is to be transmitted to the terminal of the recipient in a push-oriented manner.

If the recipient has an SMS-capable terminal, he must subscribe in advance with the provider of the system, providing information that he has an SMS-capable terminal. Depending on the particular embodiment, this information may be derived on the system side on the basis of an SMS that the recipient has previously sent to the provider for subscription purposes. The relevant subscription data are stored by the provider of the system in the associated subscription database. When a call number e-mail is present for a recipient who has subscribed in this manner, the recipient receives a notification through the above-referenced e-mail server via an SMS to the call number from the destination address of the call number e-mail. The SMS contains a URL for the retrieval. Depending on the particular embodiment, the SMS also contains information concerning the title of the e-mail. In a further embodiment the SMS contains only general information concerning a new e-mail, for example in the form "You have received an e-mail." Depending on the particular embodiment, here as well the SMS also contains information concerning the title of the e-mail. In this case, retrieval is made via a URL known in advance by the recipient, or by forwarding to a "classic" e-mail address previously stored in the system by the recipient.

If the recipient has a simple terminal that is only audio-capable, which corresponds to the customary landline configuration, the recipient must subscribe in advance with the provider of the system, providing information that he has an audio-capable terminal. Depending on the particular embodiment, this information may be derived on the system side on the basis of a call from the recipient to the provider who is engaged by the recipient for purposes of the subscription. The relevant subscription data are stored by the provider of the system in an associated database. If a call number e-mail is present for a recipient who has subscribed in this manner, the recipient receives a notification through the above-referenced e-mail server via an audio message, example in the form "You have received an e-mail," concerning a call to the call number from the destination address of the e-mail. Depending on the particular embodiment, this audio message may be supplemented with information concerning the title of the e-mail. Retrieval is carried out later via a URL known in advance by the recipient, or by forwarding to a "classic" e-mail address previously stored in the system by the recipient.

The sender receives information, preferably in the form of an e-mail, when the e-mail is not deliverable to the call number, for example because the call number is invalid or is not enabled for the service, when the approach is designed on a specific network provider basis.

The sender may also store a "classic" e-mail address in the system, to which a copy of the e-mail that he sent is transmitted, so that he may track his e-mail communication at a later time, for example from his stationary terminal. This is particularly suitable when the sender operates with a mobile terminal.

In a second case the recipient wishes to receive an e-mail, addressed to his "classic" e-mail address, via his call number:

A sender sends a classic e-mail, according to the addressing rules of RFC2822, to a classic e-mail address of the recipient, which likewise complies with RFC2822. The e-mail is then forwarded, on the network/system side, by the e-mail server associated with the classic e-mail address of the recipient to a call number, as described in the first case above, when this is desired by the recipient. The recipient has previously stored the corresponding call number in the system, i.e. in the e-mail server associated with his classic e-mail address. The forwarded e-mail is further processed according to the methods described in the first case.

Sending an instant message according to the invention is explained below:

The method according to the invention may be used in a particularly advantageous manner for sending information items, in particular messages with file attachments that are intended for a recipient who uses an instant-messaging service. The destination instant-messaging address may be formed from a given call number by adding the domain name and an appropriate extension. The instant message is sent to the respective instant-messaging server that, after storing the message, accesses a database whose data are used to determine at least one information item associated with the call number concerning the technical features of the recipient terminal, and a specific recipient message is transmitted to the terminal of the recipient as a function of the information. That is, after the receipt of a call number instant message on an instant-messaging server, the information stored in a database is identified that may be associated with the call number of the recipient, and on the basis of which the further method sequence is specified, whereby the form and content of the specific recipient message that is transmitted from the server to the terminal of the recipient are dependent on the correspondingly identified information.

For the case of Session Initiation Protocol (SIP), for example, the destination address is formed from the call number and the respective SIP host name, so that the instant-messaging address is composed as follows:

sip:+491711234567@ hostname.extension

In this case, the domain extension that is completed by adding the call number for the destination address is composed of two partial identifiers, the first partial identifier being composed of the "sip:" internet protocol, which precedes the call number, and the second partial identifier being composed of an "@" character, the second-level domain "host name," and the top-level domain "extension," which follow the call number.

For example, the E164 call number is +491711234567. The instant-messaging address would then be composed of a host name "@telekom" and an extension ".de" for the destination address "sip:+491711234567@telekom.de".

Using the destination address thus obtained, the domain of the destination server is addressed and the message is sent to the destination server. If the instant-messaging server is connected to a database as described in the example for sending an e-mail, the message may be delivered, depending on the subscription data that are stored in the database for the addressed subscriber. The form and content of the specific recipient message that is transmitted from the instant-messaging server to the terminal of the recipient are dependent on the correspondingly identified information concerning the recipient terminal. The database may have a design that is localized, i.e. domain server-specific, or centralized, i.e. in which various domain servers access the database.

Sending an upload message according to the invention is explained below:

The method according to the invention may be used in a particularly advantageous manner for sending information items, in particular messages with file attachments, which are intended for a domain whose server provides access capability for the recipient, to a given call number. In this case the destination address is a domain address that is composed of the call number of the recipient and a domain extension. The message is transmitted to a respective server via uploading, and after the message is stored the server accesses a database whose data are used to determine at least one information item, which may be associated with the call number, concerning the technical features of the recipient terminal, and a specific recipient message is transmitted to the terminal as a function of the information. That is, after the receipt of a message, provided with a call number domain address, on the server associated with the domain, the information stored in a database is identified that may be associated with the call number of the recipient, and on the basis of which the further method sequence is specified, whereby the form and content of the specific recipient message that is transmitted from the server to the terminal of the recipient are dependent on the correspondingly identified information.

The sender who uses an internet-capable stationary or mobile terminal, i.e. a computer or a mobile telephone, for example, wishes to send a message via uploading to a recipient terminal 3a, 3b, 3c whose call number the sender knows. In the method according to the invention, for this purpose the call number is supplemented with a domain extension, resulting in a complete Uniform Resource Locator (URL). The supplementation may be performed manually or by automated means. The domain extension is composed of two partial identifiers. A first partial identifier is "http://www.", where "http" is protocol information referring to Hypertext Transfer Protocol, and "www" refers to a server on the World Wide Web. The first partial identifier precedes the call number. A second partial identifier follows the call number, and is formed by a top-level domain, or a subdomain and a top-level domain.

The resulting destination address is generally "http://www.call number.top-level domain" or "http//www.call number.domain.top-level domain", wherein the call number is formed in the E.164 format. The call number is 022893612345, for example. Depending on the embodiment, the destination address may include the call number in the national format i.e. http://www.022893612345.de, or in the international format, i.e. http://www.004922893612345.com. It is noted at this point that the protocol information "http" and the top-level domains "de" and "com" are stated here by way of example only. It is also possible to emphasize, for example, the network provider or service provider, for example http://www.022893612345.telekom.de.

The message is stored on the respective server. The message is retrieved by the recipient accessing the respective server, which is addressed via the URL. As a rule access is protected, for example by a password that the recipient must enter for authentication.

If the server is connected to a database as described above, the message may be delivered depending on the subscription data that are stored in the database for the addressed subscriber, whereby the form and content of the specific recipient message that is transmitted from the server to the terminal of the recipient are dependent on the correspondingly identified information. The database may have a design that is localized, i.e. domain server-specific, or centralized, i.e. in which various domain servers access the database. The further embodiment of the database corresponds to that which has been described for sending an e-mail to a given call number.

The recipient may be informed of the presence of a new message. For this purpose the recipient receives a specific audio message, SMS, or e-mail, for example, depending on the capabilities of his terminal and the respective entry in the database. In this specific recipient message the recipient obtains information that there is a new upload message for him, optionally also with provision of the URL.

The invention claimed is:

1. A method of sending a message on the basis of an internet protocol to one of a plurality of recipients each having a respective call number, a respective terminal, and a respective recipient address, the method comprising the steps of:
    forming the recipient address of the message from the call number and a domain extension;
    storing the message on a message server for further evaluation, provision to the one recipient, or both evaluation and provision to the one recipient;
    after the message is stored, accessing through the message server a database containing terminal data of respective technical performance characteristics of the terminals of the recipients, the terminal data comprising at least information as to whether the terminal of the recipients are audio-, SMS-, or email-capable;
    determining with the server from the terminal data in the database at least the audio, SMS-, or email-capability associated with the call number and concerning the technical performance characteristics of the terminal of the one recipient; and
    transmitting a specific recipient message to the terminal of the terminal of the one recipient either as an SMS, voice message, email, or instant message and depending on the identified technical performance characteristic of the terminal of the one recipient by:
        calling the one recipient if the terminal of the one recipient is audio-capable and notifying the one recipient about retrievability of the massage via an internet address,
        transmitting the specific recipient message as an SMS if the terminal of the one recipient is SMS-capable and notifying the one recipient about retrievability of the message via an internet address, and
        transmitting the specific recipient message as an email if the terminal of the one recipient is email-capable.

2. The method defined in claim 1, wherein the message is an e-mail and the message server is an e-mail server.

3. The method defined in claim 1, wherein the message is an instant message and the message server is an instant-messaging server.

4. The method defined in claim 1, wherein the message is a message that is suited for uploading to a specific domain and the message server is a domain server.

5. The method defined in claim 1, wherein the call number is followed by an identifier as a domain extension that is independent of a country or a network provider of the recipient.

6. The method defined in claim 5, wherein the identifier is formed from a "@" character followed by a neutral domain, followed by a period and a neutral extension.

7. The method defined in claim 1, wherein the domain extension is formed from a first partial identifier that precedes the call number and a second partial identifier that follows the call number.

8. The method defined in claim 7, wherein the first partial identifier is "http://www." and the second partial identifier is an extension that refers to a top-level domain or to a subdomain of a top-level domain preceded by a period.

9. The method defined in claim 7, wherein the first partial identifier is "sip:" and the second partial identifier is a "@" character followed by a host name in the form of a second-level domain, followed by a period and an extension in the form of a top-level domain.

10. The method defined in claim 1, further comprising the step of:

automatically supplementing the call number with the domain extension by the terminal of the one recipient or a server associated with the terminal of the one recipient when the message is sent.

11. The method defined in claim 1, further comprising the step of:

communicating with the call the internet address at which the recipient message may be retrieved.

12. The method defined in claim 1, further comprising the step of:

communicating with the SMS the internet address at which the message may be retrieved.

13. The method defined in claim 1, wherein the terminal data comprises information as to whether the respective terminal is instant message-capable terminal, the method further comprising the step of:

transmitting the specific message as an instant message if the terminal of the one recipient is instant-message capable.

14. The method defined in claim 1, further comprising the step of:

forwarding the message as an email to an additional email address if the call number is associated with the additional e-mail address.

15. The method defined in claim 1, further comprising the step of:

communicating with the recipient message the subject of the message and, in the case of a call, converting the subject to a voice message and announcing the voice message.

16. The method defined in claim 1, further comprising the step of:

communicating with the recipient message a password that grants access to the message via the internet address.

17. The method defined in claim 1, further comprising the step of:

caching the recipient message when it is not transmittable to the terminal of the one recipient.

18. The method defined in claim 1, further comprising the step of:

before the recipient message is transmitted, checking whether the call number of the recipient is enabled or blocked for receipt of the recipient message.

19. The method defined in claim 1, further comprising the step of:

transmitting a message to the sender that notifies the sender if the recipient message is not deliverable to the call number or if the recipient message has been delivered to the call number.

20. The method defined in claim 1, wherein the terminals are mobile telephones at least one of which can only receive voice messages, another one of which can receive SMS messages, another one which can receive instant messages, and another one of which can receive emails.

21. A system for sending a message on the basis of an internet protocol to one of a plurality of recipients each having a respective call number, a respective terminal, and a respective recipient address, the system comprising:

at least one first terminal for telecommunication that is set up for creating, sending, and providing a message on the basis of an internet protocol;

a first message server associated with the first terminal;

at least one second terminal of a plurality of terminals for telecommunication;

a second message server associated with the second terminal;

a telecommunication network having at least a first portion that connects the servers to one another and a second portion that connects the terminals to their respective message servers;

a database associated with the second message server holding a call number associated with the second terminal, terminal data concerning technical performance characteristics of the terminals, and at least one information item associated with the call number and concerning the technical performance characteristics of the second terminal, the terminal data comprising at least information as to whether the terminals are audio-, SMS-, and email-capable, the second server being configured to transmit to the second terminal a specific recipient message whose form and content is either an SMS, voice message, email, or instant message depending on the technical performance characteristic of the second terminal, and to call the terminal of the one recipient.

22. The system defined in claim 21, wherein the system has storage means for caching the specific message.

23. The system defined in claim 21, wherein the first portion of the communication network is formed by the internet, and the second portion of the communication network is formed by a line-based telephone network or a mobile wireless network.

* * * * *